Feb. 9, 1971      H. N. KEENER      3,561,302
METHOD AND APPARATUS FOR MACHINING TUBULAR MEMBERS
Filed April 24, 1968      4 Sheets-Sheet 2

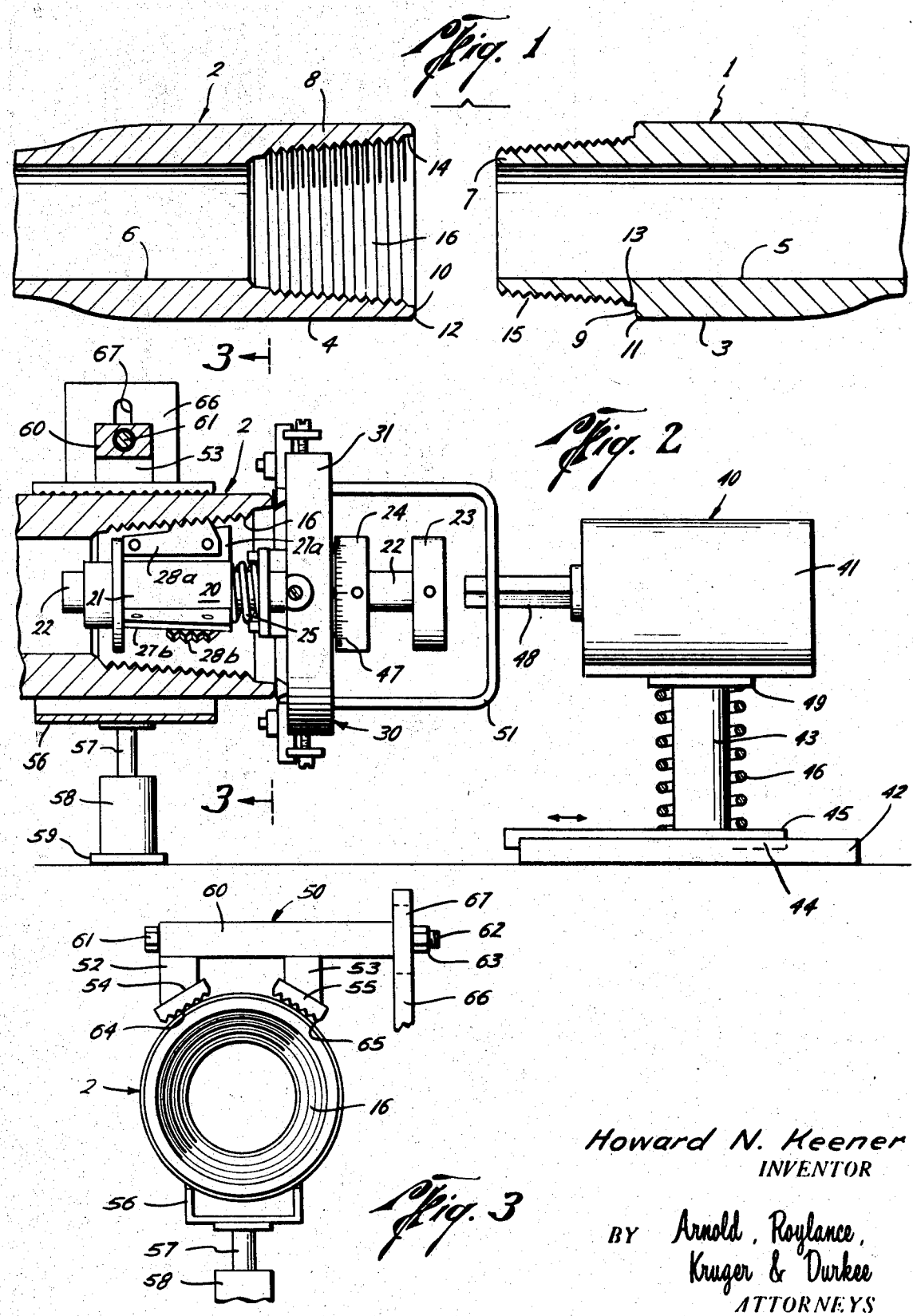

Howard N. Keener
INVENTOR

BY Arnold, Roylance,
Kruger & Durkee
ATTORNEYS

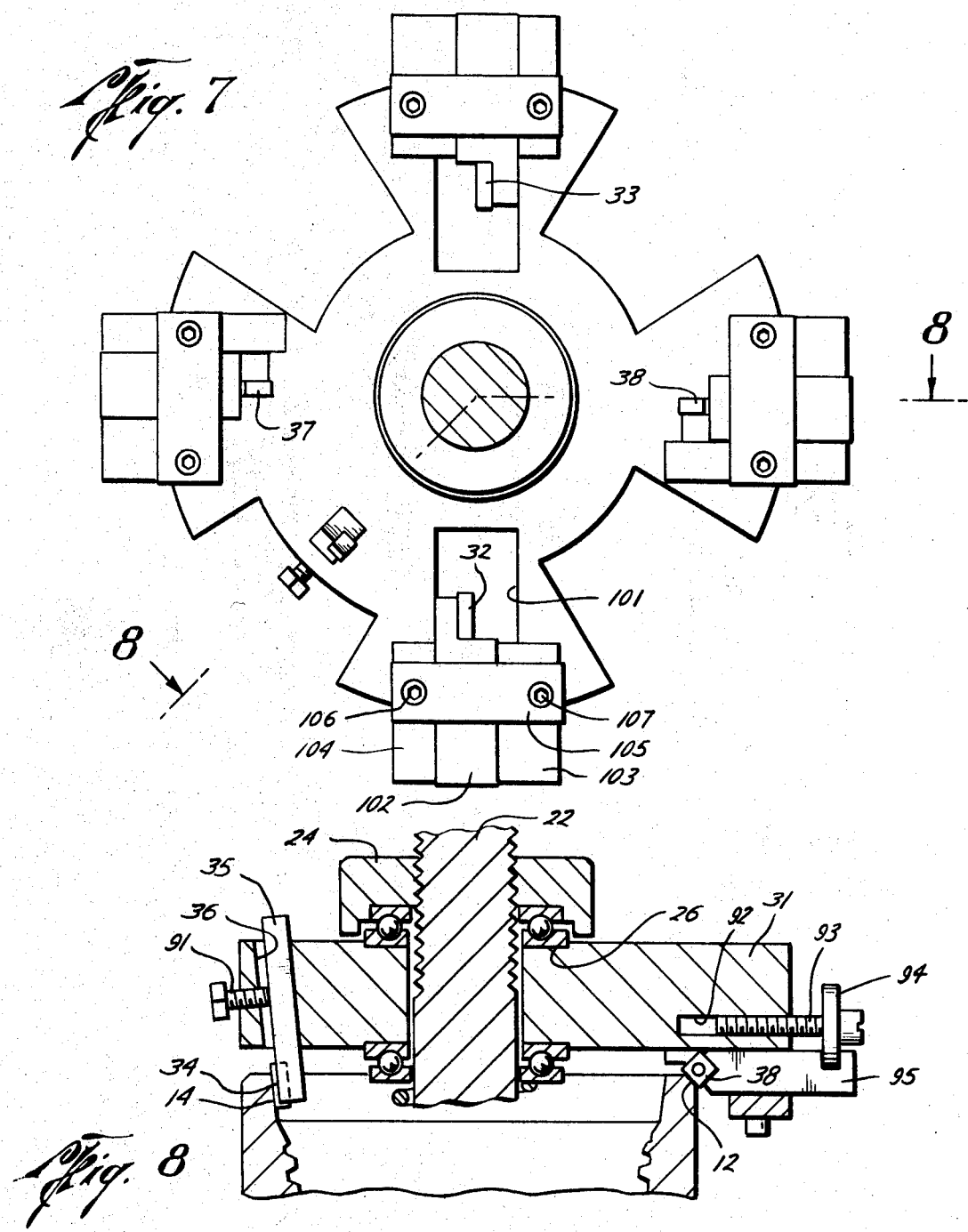

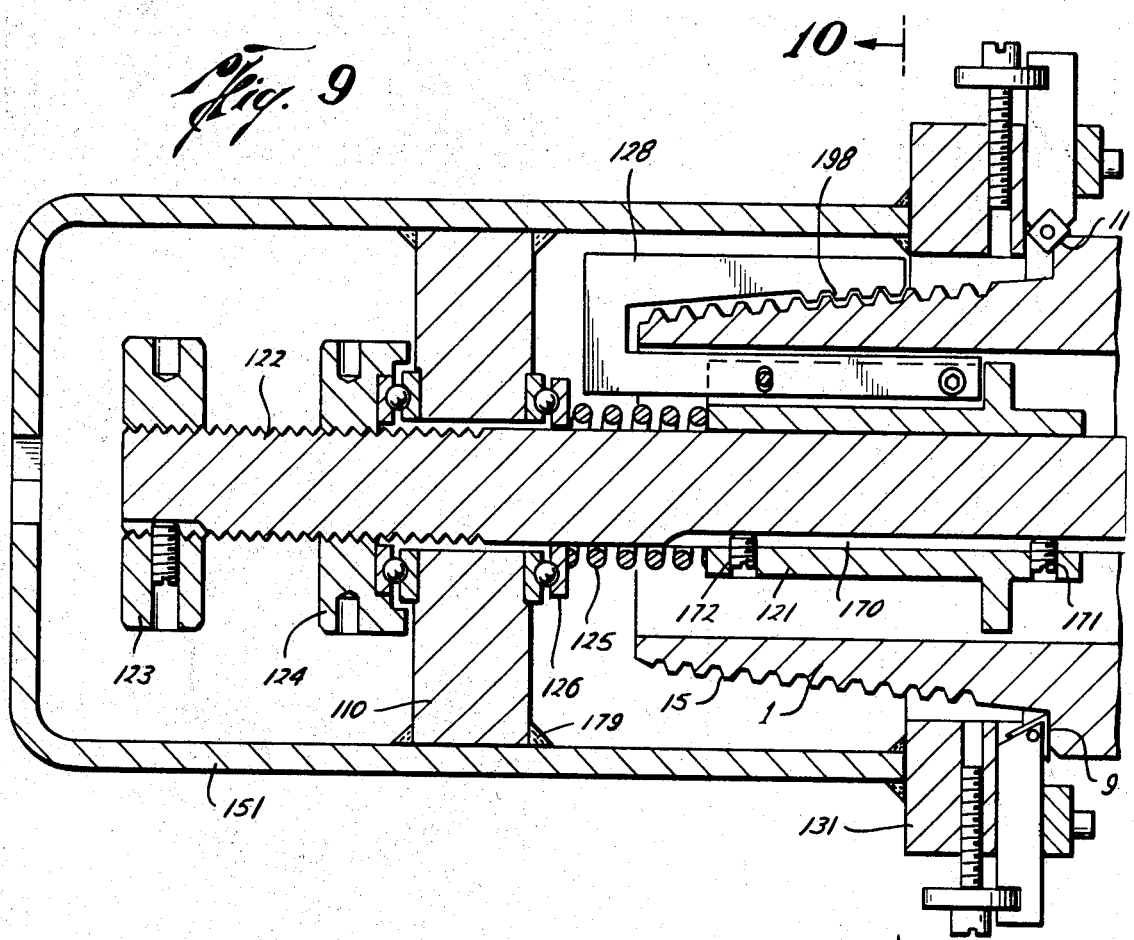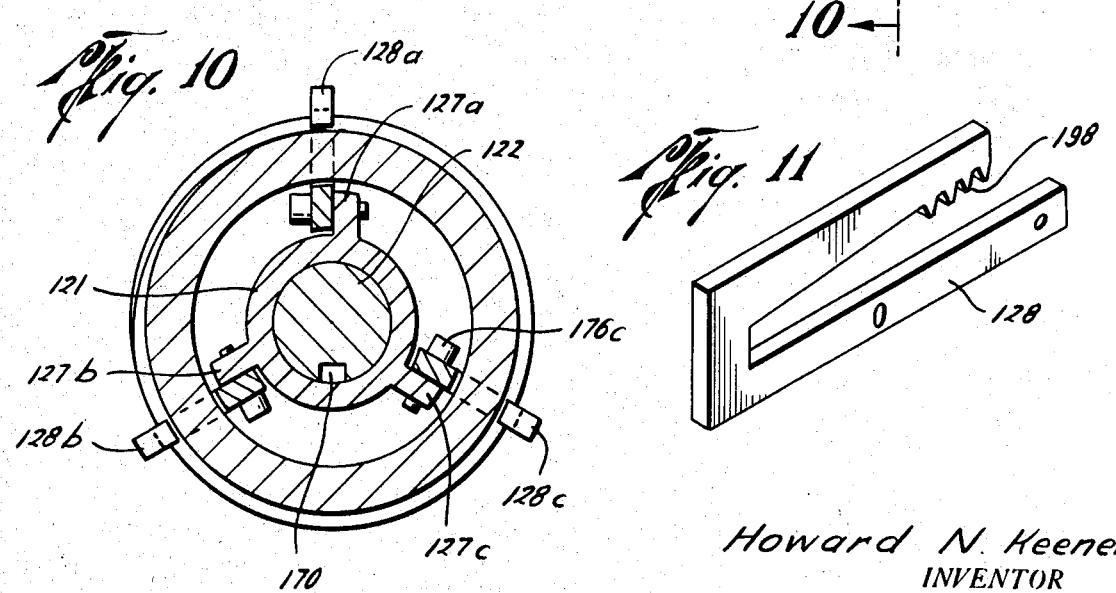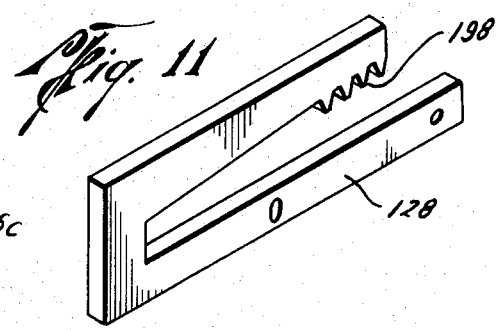

United States Patent Office 3,561,302
Patented Feb. 9, 1971

3,561,302
METHOD AND APPARATUS FOR MACHINING TUBULAR MEMBERS
Howard N. Keener, Alamo, Tex., assignor to Texas Technical Enterprises, Inc., Houston, Tex., a corporation of Texas
Filed Apr. 24, 1968, Ser. No. 723,843
Int. Cl. B23b 3/22, 5/00
U.S. Cl. 82—1
17 Claims

ABSTRACT OF THE DISCLOSURE

Apparatus is provided for simultaneously machining plural faces of a threaded tubular member. The apparatus includes an elongate longitudinal shaft adapted to be disposed into the threaded member and along the center line thereof. Onto this shaft is mounted a centering device which includes a plurality of radially extending fins being connected to snag sections, the snag sections being adapted to move into engagement with the threads of the tubular member to be machined. A generally disk-shaped cutting head is also disposed on the shaft such that it is capable of rotation about the shaft. The cutting head contains a number of individual cutting tools capable of machining the various faces of the tubular member. Means are also included for rotating the cutting head while maintaining the tubular member and centering device stationary, for moving the centering device into contact with the threads of the tubular member, and for precisely setting the cutting tools against the faces of the tubular member to achieve the desired depth of cut.

Methods are provided which allow a threaded tubular member to be machined without the necessity for cleaning the threads of the member, and which assure that the surfaces will be properly machined true to the center line of the tubular member.

BACKGROUND OF THE INVENTION

The present invention relates to methods and apparatus for machining portions of threaded pipe. These methods and apparatus have been found especially suitable for machining drill pipe connections.

In the drilling of wells such as oil and gas wells, the driller customarily uses many sections or "joints" of threaded drill pipe, these various sections being threaded together to form the drill string. Various types of drill pipe are currently employed, a couple of joints of one example being illustrated in FIG. 1. Each section or joint of such pipe is threaded at each end to mate with other drill pipe sections. One end of each section has a male or "pin" connection 1, and the other end of the section has a female or "box" connection 2. During drilling of a well, the pin end of a section sought to be added to the drill string is threaded or "stabbed" into the upstanding box end of the adjacent section on the drill string, thereby joining the section to the drill string to lengthen the drill string and allow for the drilling of a deeper hole. Each new section is added in this manner at the derrick floor.

During the drilling opeartion, the drill pipe is subjected to extreme environmental conditions. As the drill pipe is rotated in rotary drilling, the exterior surfaces of the pipe wear against the borehole wall which is typically hard rock formation. Not only do the various sections wear against the wall of the borehole, but also they wear against one another at the points of connection. Especially in deeper drilling operations, there is a great bending moment on the drill pipe which further causes frictional contact with the borehole wall and between the sections. Drilling fluid such as a drilling mud under relatively high pressure is generally circulating in the well downwardly through the center of the drill pipe to the drill bit at the bottom of the hole, and then upwardly around the exterior surface of the drill pipe in the annulus between such surface and the wall of the borehole. Further, in many formations drill pipe is subject to high temperatures and high pressure formations.

The various drilling conditions which are often encountered and such outlined above, are often detrimental to the metal drill pipe section. Various difficulties may be encountered, one of which is that the seal between pin and box connection may be desroyed. This allows drilling mud to short-circuit the drill bit and can result in even more serious consequences. The imperfections which result at pin and box connections are even more severe because of the fact that the driller will remove the various sections of drill pipe from the well and stack them on or near the derrick floor. When next used on that well or on another well, it is totally impractical and often impossible to match adjacent drill pipe sections as to amount of wear encountered. So it often happens that one section of greatly worn drill pipe will be threaded onto a section that is worn very little or not at all, this leading to further shoulder seal problems.

Deformation of portions of the drill pipe joints and ultimate failure may result.

A conventional pin and box type connection is illustrated in FIG. 1. As seen in that drawing, the pin 1 includes an outer circumferential face 3 (commonly called the OD) and an inner circumferential face 5 (commonly called the ID), these faces being joined by a tapering portion 7 which tapers away from the OD toward the ID. A smooth flat radial shoulder 9 and bevel 11 join the tapering portion to the face 3. The tapering portion 7 includes a smooth inclined shoulder 13 adjacent the radial shoulder 9, and threads 15 disposed continuously along the remainder of the exterior surface of tapered portion 7.

Box 2 includes an outer circumferential face 4, an inner circumferential face 6, and a tapered portion 8 joining the faces 4 and 6, the portion 8 tapering from the inner face 6 to the outer face 4 at an angle equal to the angle of taper of the corresponding portion of the pin 1. The tapered portion 8 is joined to the outer face 4 by a smooth flat end face 10 and beveled face 12. The inner surface of the tapered portion includes an inner face 14 adjacent the end face 10, and threads 16 adapted to mate with the threads 15 of the pin 1.

When the pin and box portions are threaded together, the end face 10 of the box is abutted against the radial shoulder 9 of the pin, the abutment of these faces forming a seal to prevent the flow of fluid therethrough.

When subjected to drilling conditions such as mentioned above, the exterior surfaces 3 and 4 of the pin and box are worn away by rubbing of the drill pipe against the wall of the borehole. Part or even all of the face 10 or shoulder 9 may also be worn away in this manner. Also, the face 10 and shoulder 9 may be galled by rubbing together under the extreme drilling conditions, causing irregularities to be formed on such surfaces so that they are no longer smooth and flat.

If these or other difficulties are encountered the pin and box will not mate so that the surfaces 9 and 10 are in flush contact. Consequently, the seal may be broken and a drilling fluid short-circuit may develop resulting in failure or severe damage to the drill pipe. And the structural rigidity of the drill string is impaired.

Actual photographs and examples of drill pipe failure may be seen for example at pages 1–10 of a publication of the Reed Roller Bit Company of Houston, Tex., entitled "Manual T–265."

In order to alleviate the difficulties caused by these imperfections on the surfaces 9 and 10, as well as imperfections in the beveled surfaces 11 and 12 and surfaces 13 and 14, it is customary to periodically machine these surfaces by grinding, etc. This resurfacing is ordinarily done in the field. With prior art machining apparatus and methods, it has been extremely difficult if at all possible to accurately align the machine tool with the central axis of the drill pipe section being machined. This is especially true since the pipe is tapered. As can be readily understood, it is absolutely critical that the tool be so properly aligned, in order that the machining be true to the axis of the pipe. Otherwise, more harm than good can result from the machining operation.

It has also been very difficult or impossible to use prior art apparatus and methods without thoroughly cleaning the threads of the pin and box portions. Cleaning the threads to the extent necessary is a costly and tedious procedure, but one which has heretofore been necessary.

Prior art methods have generally depended upon (1) use of a cross feed lathe-type tool which has to be fed back and forth across the faces of the pipe, (2) separate operations for each face to be machined, (3) visual observation by the operator—and hence the human error coincident therewith—to align the cutting tool so as to cut the faces true to the longitudinal axis of the pipe, and (4) thoroughly cleaning the threads of the pipe section to be machined.

This invention eliminates all of these distinct disadvantages of the prior art.

The present invention provides methods and apparatus wherein the machine tool is in all cases accurately aligned with the central longitudinal axis of the drill pipe so that there can be no mistake in machining the desired surfaces true to center. Also, the present invention provides methods and apparatus whereby such machining can be accomplished without having to clean the threads of the drill pipe sections.

The invention further provides methods and apparatus whereby plural faces of a drill pipe or other tubular member may be simultaneously machined.

Consequently, the present invention provides methods and apparatus wherein more accurate machining of drill pipe surfaces is accomplished in much less time and at much less cost when compared with presently known methods and apparatus.

SUMMARY OF THE INVENTION

This invention relates to methods and apparatus for machining tubular members such as drill pipe of the type used in oil and gas wells. These methods and apparatus are of special utility for field use to resurface drill pipe members at the well site.

The apparatus provided includes a centering head disposed on a central longitudinal shaft adapted to be placed on the longitudinal axis of the drill pipe to be machined. The centering head has a plurality of projecting members each of which has thereon a snag section to engage the threads of the drill pipe section to be machined.

The apparatus provided by this invention further includes a cutting head adapted to be disposed on the same central longitudinal shaft as the centering head. The cutting head desirably includes tools suitable for simultaneously machining the surfaces 9 and 11 of a pin, and the surfaces 10, 12, and 14 of a box.

The apparatus provided by this invention further includes a clamp arrangement for retaining a section of drill pipe to be machined.

The methods provided by this invention include a method for simultaneously beveling, facing, and chamfering a pin or box connection. A method for assuring the machining of drill pipe sections about a true central axis is also provided, and further a method is provided for so machining drill pipe sections without having to clean the threads of the pipe.

BRIEF DESCRIPTION OF THE DRAWINGS

The invention will be hereinafter described in terms of preferred embodiments, which embodiments are illustrated in the accompanying drawings which form a part of this application and wherein:

FIG. 1 is a cross-sectional view of prior art pin and box ends of a couple of joints or sections of drill pipe, showing the faces on such pipe which are machined in accordance with this invention;

FIG. 2 is a side view, partially in section, of apparatus constructed in accordance with one embodiment of this invention;

FIG. 3 is a view taken along the line 3—3 of FIG. 2;

FIG. 7 is a view taken along the line 7—7 of FIG. 4;

FIG. 8 is a view taken along the line 8—8 of FIG. 7;

FIG. 9 is a view similar to FIG. 4 but illustrating another embodiment of the invention;

FIG. 10 is a view taken along the line 10—10 of FIG. 9; and,

FIG. 11 is a pictorial view of a portion of the apparatus shown in FIG. 9.

DETAILED DESCRIPTION OF PREFERRED EMBODIMENTS

Figure 4:
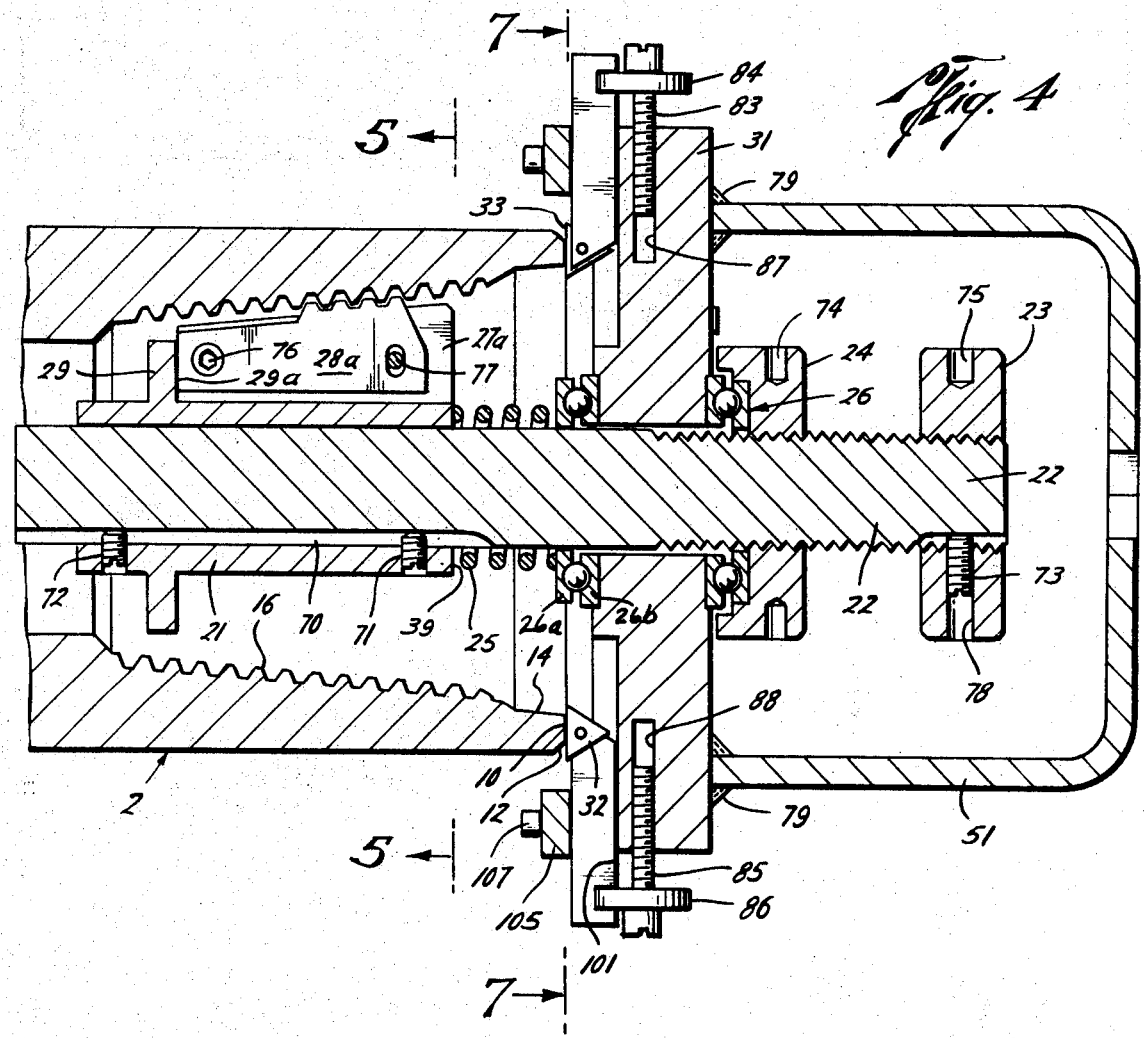
FIG. 4 is an enlarged view illustrating in more detail a portion of the apparatus shown in FIG. 2.
Figure 5:
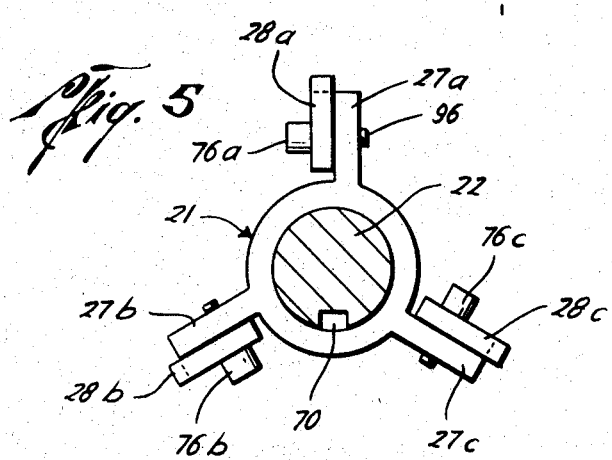
FIG. 5 is a view taken along the line 5—5 of FIG. 4.

FIG. 1 shows pin and box connections illustrating the faces which it is desired to machine, as described above in this specification. Such faces are the radial shoulder 9, bevel face 11, and inclined face 13 of pin portion 1, and the end face 10, bevel face 12, and inclined face 14 of the box portion 2. It will be understood that it is not always desired to machine each and every one of these faces; for example, it is often not desired to machine the face 13 of pin portion 1.

Apparatus constructed in accordance with this one embodiment of the invention for so machining these faces of drill pipe is illustrated in FIG. 2, the apparatus of this embodiment being useful in connection with a box connection 2. Such apparatus generally comprises a centering device 20 for retaining the portion of drill pipe on its true longitudinal axis with respect to cutting tools, cutting apparatus 30 for performing the various machining operations desired, motive means 40 for rotating the cutting apparatus with respect to the drill pipe, and clamping means 50 for securely retaining the drill pipe to be machined in a fixed position during the machining operations.

In accordance with this embodiment of the invention, the centering device and cutting apparatus are each disposed on a longitudinal shaft 22 which extends into the drill pipe portion being machined on the longitudinal axis thereof, and to a point axially disposed therefrom. The apparatus is supported on a suitable support such as the base 59 by means such as hereinafter described. The cutting apparatus 30 is rotated with respect to the drill pipe section being machined, by means of motive means 40 supported on a separate support such as the base 42.

Centering means 20 constitutes a very important portion of this invention, such means rendering it possible to perform plural operations on a drill pipe section while retaining the section on its true longitudinal axis, and without the necessity for cleaning the threads of the pipe. Such means therefore render possible swift and accurate machining of the various faces of the drill pipe sections.

Such means comprise generally a cone 21 having a tubular section the inside diameter of which is approximately equal to the outside diameter of the longitudinal shaft 22 upon which the centering means is disposed, and a plurality of fins 27. Extending radially outwardly from the tubular portion 21 at a plurality of points are the fins 27, three such fins 27a, 27b, and 27c being illustrated in this embodiment. These fins are in the form of generally flat plates the surface planes of which are parallel to the longitudinal axis of the shaft 22. Each fin is desirably formed to gradually taper longitudinally at the outermost surface thereof. The larger diameter end is disposed toward the cutting apparatus 30, and the smaller diameter end is adjacent a radial shoulder 29a on the cone 21, formed by a radially extending portion 29. The centering cone 21 is desirably retained on the shaft 22 by means of setscrews 72 and 71 which are disposed through appropriate holes in the tubular portion of cone 21 into a longitudinal groove 70 formed in the shaft 22 (see FIG. 4).

Figure 6:
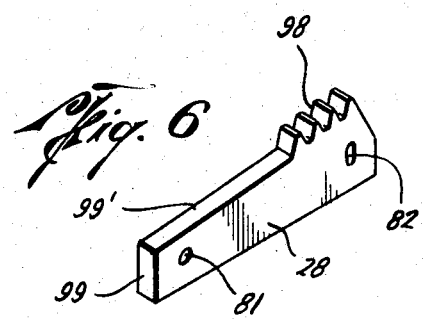
FIG. 6 is a pictorial view of a portion of the apparatus shown in FIG. 4.

Anchoring means important to the invention are provided in connection with the fins 27. Such anchoring means desirably take the form of snag sections 28, one such snag section 28a, 28b, and 28c being attached to each of the fins 27a, 27b, and 27c respectively. Each of these snag sections 28, one of which is pictorially illustrated in FIG. 6, has a smooth flat lower surface for fitting adjacent the tubular portion of the cone 21, an end face 99 for fitting against the shoulder 29a and an upper face 99' opposite the lower face. The face 99' is tapered in approximately the same manner as the outer surface of the fins 27. At the larger diameter end is included one or more teeth 98 of substantially the same pitch as the threads 16 of the box portion 2. It will be noted, however, that these teeth 98 are cut off short of their crests so that they do not extend all the way into the valleys of the threads 16. That is, the teeth firmly engage the crests of the threads 16 but do not completely mate therewith. In other words, the valley to crest dimension of the teeth 98 is smaller than the valley to crest dimension of the threads 16. In this manner, the teeth 98 will effectively snag into the threads 16 even if the threads 16 are dirty. Snagging of the teeth 98 into the threaded section 16 of the box 2, firmly anchors the drill pipe section to the cone 21. And since the cone is firmly positioned on the longitudinal shaft 22 the center of which is, in turn, aligned on the longitudinal center line of the drill pipe section, the centering device 20 serves to accurately center the box portion 2 (and consequently the faces 10, 12 and 14 thereof) with respect to the longitudinal shaft 22.

Suitable means for adjustment of the snag sections 28 on the fins 27 are desirably provided. Such means may include apertures 81 and 82 in the sections 28, and corresponding apertures in the fins 27, through which may be engaged suitable screws 77, 96, and nuts 76.

Elongate longitudinal shaft 22 extends from its one end positioned inside the box 2, the axis of the shaft being disposed on the longitudinal axis of the box 2, to a point longitudinally spaced from the opening of the box as defined by the end face 10 thereof. Just outside the opening of the box, the cutting apparatus 30 is positioned such that it can be readily moved into contact with the end thereof. The shaft is desirably threaded from cutting apparatus 30 to the end of the shaft opposite the centering device 20.

Cutting apparatus 30 generally comprises a cutting head 31 having thereon a plurality of individual cutting tools. The cutting head 31 is disposed on the shaft 22 by any siutable means such as by mounting on the thrust bearing 26. Such thrust bearing, which may for example be of the type manufactured by Timken Roller Bearing Co. of Canton, Ohio, has a stationary portion 26a and a rotating portion 26b, to allow for relatively frictionless rotation of the cutting head 31 on the shaft 22.

A coil spring 25 is disposed between the cutting head 31 and the shoulder 39 formed by the end of the cone 21, such spring exerting an urging force tending to move the cutting head away from the fixed cone 21.

The individual tools selected for placement on the cutting head 31 depend upon the exact operations desired to be performed on the drill pipe section. One of the distinct advantages of this invention is that a plurality of such tools may be employed at once. Since the cutting head is concentrically placed on the shaft 22 with the centers thereof coinciding, and since the drill pipe section is also centered with respect to the center line of the shaft 22, it is a relatively simple matter to position the individual cutting tools on the cutting head 31 so that they may accurately cut the various faces of the drill pipe true to the central axis thereof.

Cutting tools suitable for machining each of the surfaces 10, 12 and 14 of the box 2 are illustrated in the embodiment shown in FIG. 7. Facing tools 32 and 33 are positioned for machining the end face 10 of box 2. Beveling tools 37 and 38 are positioned to bevel the surface 12 of the box, and chamfering tool 34 is positioned to chamfer the inner face 14 of the box. Each of these tools—and it is emphasized that any number of suitable tools may be employed, the particular numbers shown here representing applicant's preference at the time of application—is desirably positioned on the head 31 in standard tool post mounting. Referring to FIG. 7, for example, the facing tool 32 is disposed against base metal 102 which is positioned in a groove 101 cut into the surface of the cutting head 31. On either side of the base metal 102 are pieces 103 and 104 of back-up material. The base metal and back-up material are held securely by a strap 105 retained by bolts 106 and 107.

Suitable means are desirably included for adjusting the facing tools 32 and 33. Such means desirably include elongate screws 83, 85, positioned in holes 87 and 88 in the cutting head 31. Screws 83, 85, have enlarged flanges 84 and 86, respectively, thereon, which fit into grooves in the base metal associated with each of the facing tools 32 and 33. As the screws are adjusted in the holes 87 and 88, the base metal is adjusted to correspondingly adjust the facing tools 32 and 33.

Two beveling tools 37 and 38 are illustrated in this embodiment of the invention. These tools operate to bevel the face 12 of the box 2, and are mounted in much the same manner as the facing tools 32 and 33. Also, these beveling tools 37 and 38 are desirably adjustable and suitable means for such adjustment is illustrated in FIG. 8. Here it is seen that the beveling tool 38, for example, is held in place by base metal 95. Into a hole 92 in the cutting head 31 is disposed an elongate screw 93 having an enlarged flange 94 thereon. The flange 94 fits into a slot or groove in the base metal 95 and functions to adjust the base metal 95—and therefore adjust the cutting tool 38—upon adjustment of the screw 93 in the hole 92.

Only one inner facing tool, or chamfering tool, 34 is illustrated in this embodiment of the invention. The tool 34 is supported on a base metal holder 35, the holder 35 being elongate and protruding from an aperture 36 formed through the cutting head 31. The holder 35 is held in place by a screw 91 disposed approximately perpendicular to the holder 35.

In FIGS. 4 and 8 it is clearly illustrated how the various tools 32, 33, 34, 37 and 38 are placed relative to the center of the cutting head 31, and relative to one another, to accurately cut the various faces 10, 12 and 14 of the box 2. As will be understood by those skilled in the art, the various tools are constructed of hard abrasive material such as tungsten carbide, which upon movement across the various faces in contact therewith will result in proper machining of such faces.

Relative movement of the cutting tools across the various faces to be machined is achieved in this invention by rotary motion of the cutting head 31 while maintaining the drill pipe stationary. Any suitable means may be employed to supply rotary motion to the cutting head 31, one such suitable means being illustrated as the motive means 40 in FIG. 2.

Motive means 40 may generally comprise a motor (not shown) and casing 41 therefor, supported on a base platform 42 by means of a vertical support member 43. In order that the motive means may be movable within limits longitudinally with respect to the drill pipe section being machined, the motor is desirably mounted on a platform 49 which is in turn mounted on a flat support member 45 by means of a spring 46. The flat support member 45 is disposed in a longitudinal slot 44 in the base platform 42, thereby allowing for back and forth longitudinal movement of the motor apparatus as the cutting settings are changed.

A drive bracket 51 is operably connected to the cutting head 31, as by welding at 79. A spline shaft 48 from the motor is attached to the drive bracket 51, and in this manner rotary motion is ascribed to the cutting head 31 upon actuation of the motive means.

The cutting apparatus 30 is finely adjusted with respect to the end of the drill pipe section by means of the feed nut 24 which is positioned on the shaft 22 against the thrust bearing 26 on the side thereof opposite the drill pipe section. As the feed nut 24 is screwed in a clockwise direction, the cutting head is moved against the urging of the spring 25, toward the drill pipe section. Calibrations 47 on the feed nut allow the operator to move the cutting head against the faces of the drill pipe section to the exact extent necessary to machine such faces to any desired depth. Holes 74 in the exterior face of the feed nut are convenient for reception of a spanner wrench.

Spaced longitudinally from the feed nut 24 on the shaft 22 in a direction away from the cutting head 31 is a stop nut 23. Stop nut 23 is fixed to the shaft 22 by means of a square key and setscrew 73 disposed in a hole 78 in the stop nut. Holes 75 in the exterior face of the nut 23 are also convenient for reception of a spanner wrench. Positioning of the cone 21 in the drill pipe section is accomplished by rotation of the nut 23.

The drill pipe section to be machined is held firmly and securely in place by suitable clamping means 50, one desirable embodiment being illustrated in FIGS. 2 and 3. Here it is seen that the lower portion of the drill pipe section rests in an upturned C-shaped bracket 56, which is supported from a suitable base 59 by means of a vertical rod 57. Actuating means for instituting vertical movement of the bracket 56 are desirably included, such means taking the form for example of a suitable hydraulic cylinder 58. In this manner, the bracket 56 may be readily lowered after completion of the machining operations, and then a new section of drill pipe installed in the bracket and the bracket then raised back into the position shown in FIG. 3.

The pipe is held in position in the bracket 56 by means of gripping members 54 and 55 which contain slip segments 64 and 65, the slip segments serving to firmly grip the pipe surface.

Gripping members 54 and 55 are suspended by means of arms 52 and 53 from an overhead longitudinal bar 60. The bar 60 is, in turn, movably attached to a support member 66, the support member 66 having a vertically disposed slot 67 therein. The bar 60 is adjustable in the slot 67 by means of a threaded rod 62 extending therethrough and unts 61 and 63 threaded to the rod 62 at the ends of the bar 60. The adjustable overhead clamp containing the gripping members which firmly hold the pipe, together with the vertically adjustable bracket 56, serve to securely hold in place the drill pipe section to be machined.

An alternative embodiment of the invention applicable to machining pin portions of drill pipe sections, rather than box portions, is illustrated in FIGS. 9–11.

The cutting apparatus for the pin end 1 is substantially the same as that previously illustrated and described in connection with the box end 2. However, it may be desired to machine the surfaces 9 and 11 only—rather than 9, 11, and 13—of the pin 1.

FIG. 9 illustrates a centering cone 121 disposed on the shaft 122 by means of screws 171 and 172 fitting into a groove 170, all just as described in connection with the aforementioned embodiments. The cone 121 has three fins 127a, 127b, and 127c, onto each of which is fastened a snag section 128a, 128b, and 128c, respectively. The sections 128, however, are of distinctively different shape from the sections 28 of the FIGS. 1–8 embodiment. The snag sections 128 are of somewhat J-shape with the teeth 198 on the inside surface of the J for anchoring into the threads 15 of pin portion 1. In other respects, the cone 121 is like the cone 21 of the FIGS. 1–8 embodiment.

Also disposed on the central longitudinal shaft 122 are stop nut 123, feed nut 124, thrust bearing 126, and spring 125 between the thrust bearing and the cone 121. A different mounting of the cutting head 131 is provided, however, the cutting head being mounted directly on the bracket 151, while a radially inwardly extending portion 110 of the bracket 151 is mounted for rotation with respect to the shaft on the thrust bearing 126.

In other respects, it will be seen that this embodiment of the invention is identical to the embodiment of FIGS. 1–8.

In operation, it is seen that a section of drill pipe (for example the box end 2) which it is desired to machine, is placed on the bracket 56 after that bracket has been lowered by means of the hydraulic cylinder 58, the drill pipe section being turned so that the box end faces in a direction toward the cutting apparatus. The overhead bar 60 is adjusted according to the size of the drill pipe section being used, and then the bracket 56 is raised by means of the hydraulic cylinder to the position illustrated in FIG. 3.

The shaft 22 is then placed inside the box 2 such that the cutting head is positioned adjacent the end of the box, the desired cutting tools having been previously placed onto the cutting head in the appropriate locations. (It is noted that the arrangement of cutting tools, and the size of the centering apparatus 20, will need be changed for different sizes of drill pipe.) The stop nut 23 is rotated until the snag sections 28 firmly snag into the threads 16 on the box. The feed nut 24 is then rotated until the cutting tools 32, 33, 34, 37, and 38 are correctly positioned adjacent the surfaces 10, 12, 14 to be machined, to the extent necessary for the desired depth of cut as measured by the calibrations 47.

The motive means 40 is then actuated to rotate the drive bracket 51 and consequently rotate the cutting head 31, the drill pipe section being securely and rigidly held stationary against the turning of the machining tools.

When the machining operation is completed (which may for example be about 15 seconds), the stop nut and feed nut are rotated counter-clockwise to release the snag sections 28 from the threads 16 and remove the cutting tools from contact with the box. The motive means may be withdrawn if desired by moving the support member 45 in the slot 44. The bracket 56 is lowered by means of the hydraulic cylinder, and the drill pipe section is removed.

In this manner, an operation which is extremely fast in comparison with the prior art methods is performed. The entire operation may be completed, in fact, in less than one minute. Perhaps even more important, however, is the fact that machining of the drill pipe sections true to the longitudinal axis of the pipe is accurately accomplished in every instance. And these operations are accomplished without the necessity for cleaning the threads of the drill pipe section to be machined—such cleaning being a laborious and time-consuming task necessary with the prior art methods and apparatus.

While the invention has been described in terms of preferred embodiments which represent the best mode known to the inventor at the time of the application, it will be understood by those skilled in the art that various changes and modifications may be made in the structures and methods illustrated without departing from the scope of the invention, which is defined in the appended claims. For example, although the above discussion has been focused upon use of the invention with drill pipe sections, it will be apparent that the invention can also be used in connection with other tubular members which have surfaces which need to be machined, and in fact the invention is distinctly useful in connection with all tubular members which depend upon mating shoulders for fluid seal and structural rigidity.

What is claimed is:

1. A method for machining at least one face of a threaded tubular member without necessitating the cleaning of the threads of said member, comprising:

positioning an elongate shaft having a plurality of projecting teeth thereon along the longitudinal axis of said tubular member, said teeth having a smaller valley to crest dimension than the valley to crest dimension of the threads of said tubular member;

rotating the shaft to engage the teeth thereof with the threads of said tubular member to center said tubular member with respect to said shaft;

providing at least one cutting tool mounted on said shaft and adapted to rotate about the center thereof;

positioning said cutting tool adjacent said face of said tubular member; and, rotating said cutting tool to machine said face true to the longitudinal axis of said tubular member.

2. A method for simultaneously machining plural faces of a tubular member having a tapered threaded portion without necessitating the cleaning of the threads of said member, comprising:

clamping the external surface of said tubular member to a support to rigidly hold said member;

positioning an elongate shaft along the longitudinal axis of said tubular member and projecting therefrom, said shaft having a tapered portion with teeth thereon for engaging the threads of said tubular member, said teeth having a smaller valley to crest dimension than the valley to crest dimension of said threads;

rotating the shaft until said teeth engage said threads and anchor the tubular member concentrically with respect to said shaft;

providing cutting tools mounted on said shaft and adapted to rotate about the center thereof;

positioning said cutting tools adjacent said plural faces of said tubular member; and, rotating said cutting tools about said shaft while holding said shaft stationary, to frictionally engage said cutting tools against said faces, so that said plural faces are simultaneously machined true to the longitudinal axis of said tubular member.

3. Apparatus for machining at least one face of a threaded tubular member, comprising:

a shaft;

means fixed to said shaft for centering said tubular member with respect to the longitudinal axis of said shaft, including a plurality of teeth thereon adapted to engage with the threads of said member, said teeth having a valley to crest dimension smaller than the valley to crest dimension of the threads of said member;

cutting means operably connected with said centering means and adapted to rotate with respect to said tubular member about the longitudinal axis thereof, said means including at least one cutting tool adapted upon rotation to frictionally engage the face of said tubular member to machine said face true to said longitudinal axis of said tubular member; and, means for rotating said cutting means.

4. Apparatus suitable for simultaneously machining plural faces of a threaded tubular member, comprising:

a centering device disposed on an elongate longitudinal shaft, said device including means for engaging the threaded portion of said tubular member to rigidly anchor said tubular member concentrically about the axis of said shaft, said engaging means including teeth having a smaller valley to crest dimension than the valley to crest dimension of the threads of said threaded member;

cutting means disposed on said elongate shaft longitudinally spaced from said centering device, said cutting means being disposed for rotary movement with respect to said shaft and including cutting tools adapted upon rotation of said cutting means about said shaft, to frictionally engage said plural faces of said tubular member to simultaneously machine said faces; and, motive means for rotating said cutting means about said elongate shaft while said centering device and tubular member remain stationary.

5. Apparatus in accordance with claim 4, wherein said engaging means includes a plurality of fins radially projecting from said shaft, each of said fins having said teeth formed thereon, for engaging with the threads of said tubular member without completely mating therewith.

6. Apparatus in accordance with claim 4, wherein means are included on said shaft for moving said engaging means into contact with said threads, and for releasing said engaging means from said threads.

7. Apparatus in accordance with claim 4, wherein means are included on said shaft for moving said cutting means longitudinally on said shaft for engagement of said cutting tools with said plural faces to an extent necessary to achieve the depth of cut desired.

8. Apparatus in accordance with claim 7, wherein urging means are included on said shaft between said centering device and said cutting means, to urge said cutting means longitudinally in a direction away from said centering device.

9. Apparatus in accordance with claim 4, wherein means are included for rigidly clamping the exterior surface of said tubular member to an external support.

10. Apparatus in accordance with claim 9, wherein said clamping means includes a bracket into which the lower portion of the tubular member may be placed, said bracket being movable to raise and lower said tubular member.

11. Apparatus in accordance with claim 9, wherein said clamping means includes gripping members having slip segments therein, said slip segments serving to firmly grip the exterior surface of said tubular member.

12. Apparatus in accordance with claim 4, wherein said cutting means includes a cutting head disposed on said shaft such that the center of said cutting head is on the longitudinal axis of said shaft, said cutting tools being retained in said cutting head.

13. Apparatus suitable for simultaneously machining plural faces of a threaded tubular member, comprising:

a centering device disposed on an elongate longitudinal shaft, said device including a plurality of fins extending radially from said shaft, and, snag sections on said fins, said snag sections having teeth with a smaller valley to crest dimension than the valley to crest dimension of the threads of said tubular member, so that said teeth do not completely mate with said threads;

means on said shaft for moving said snag sections into engagement with the threads of said tubular member, to rigidly center said tubular member on said shaft and hold it firmly in place thereon;

cutting apparatus including a cutting head disposed on said elongate shaft longitudinally spaced from said centering device and adapted for rotary movement with respect to said shaft, and, plural cutting tools on said cutting head radially spaced from the axis of said shaft, each of said cutting tools adapted to engage one of the plural faces of said tubular member and upon rotation to machine the engaged face;

means for longitudinally adjusting said cutting head into contact with said tubular member to the extent necessary to achieve the depth of cut desired; and, motive means for rotating said cutting head about said shaft while said centering device and said tubular member remain stationary.

14. Apparatus in accordance with claim 13, wherein said means for longitudinally adjusting said cutting head comprises a calibrated feed nut threaded on said shaft.

15. Apparatus in accordance with claim 13, wherein urging means are included on said shaft between said centering device and said cutting head, said means urging said cutting head longitudinally in a direction away from said centering device.

16. Apparatus in accordance with claim 13, wherein means are included for rigidly clamping the exterior surface of said tubular member to an external support.

17. Apparatus in accordance with claim 16, wherein said clamping means includes a bracket into which the lower portion of said tubular member is adapted to fit, said bracket being movable to raise and lower said tubular member, and gripping members having slip segments therein for firmly gripping the upper surface of said raised tubular member, the tubular member being thus firmly secured between said bracket and said gripping members.

References Cited

UNITED STATES PATENTS

| | | | |
|---|---|---|---|
| 1,993,561 | 3/1935 | Meglitz | 144—205 |
| 2,211,183 | 8/1940 | Tytus et al. | 82—4.3 |
| 2,810,141 | 10/1957 | Langston | 10—87 |
| 2,900,858 | 8/1959 | Gauthier et al. | 82—4.3 |
| 3,124,024 | 3/1964 | Pittman | 82—4.3 |
| 3,181,398 | 5/1965 | Rogers | 82—4.3 |

RICHARD J. HERBST, Primary Examiner

E. M. COMBS, Assistant Examiner

U.S. Cl. X.R.

82—4